(12) United States Patent
Koo et al.

(10) Patent No.: US 8,369,350 B2
(45) Date of Patent: Feb. 5, 2013

(54) METHOD FOR TRANSMITTING AND RECEIVING FRAME IN WIRELESS LAN

(75) Inventors: Ki Jong Koo, Daejeon (KR); Hyun Joo Bae, Daejeon (KR); Byung Sun Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 511 days.

(21) Appl. No.: 12/556,051

(22) Filed: Sep. 9, 2009

(65) Prior Publication Data

US 2010/0157962 A1    Jun. 24, 2010

(30) Foreign Application Priority Data

Dec. 22, 2008    (KR) .................... 10-2008-0131724

(51) Int. Cl.
  *H04L 12/54*    (2006.01)
(52) U.S. Cl. .................... 370/429; 370/238; 709/236
(58) Field of Classification Search .................. 370/229,
  370/235, 238, 310, 328, 338, 351, 352, 428,
  370/429, 259, 260, 263, 265; 709/232, 235,
  709/236, 204, 205, 206, 207
  See application file for complete search history.

(56) References Cited

U.S. PATENT DOCUMENTS

| 7,099,283 | B2 * | 8/2006 | Matta et al. ................... 370/252 |
| 2005/0152359 | A1 * | 7/2005 | Giesberts et al. ............. 370/389 |
| 2007/0297375 | A1 * | 12/2007 | Bonta et al. .................... 370/338 |

FOREIGN PATENT DOCUMENTS

| KR | 1020050001322 A | 1/2005 |
| KR | 1020050119219 A | 12/2005 |
| KR | 1020060044237 A | 5/2006 |
| KR | 1020060126862 A | 12/2006 |

OTHER PUBLICATIONS

Seongkwan Kim, et al; "MCCA: A High-Throughput MAC Strategy for Next-Generation WLANs", IEEE Wireless Communications, Feb. 2008, pp. 32-39.

* cited by examiner

*Primary Examiner* — Chi Pham
*Assistant Examiner* — Weibin Huang
(74) *Attorney, Agent, or Firm* — Ladas & Parry LLP (57) ABSTRACT

The transmission delay of a voice frame can be reduced by performing internal collision resolution and frame aggregation according to the presence or absence of a voice frame awaiting transmission in a MAC layer, thereby reducing an end-to-end voice transmission delay time for a VoIP service.

5 Claims, 6 Drawing Sheets

METHOD FOR TRANSMITTING AND RECEIVING FRAME IN WIRELESS LAN

CROSS-REFERENCE TO RELATED APPLICATION

This application claims the benefit of Korean Application No. 10-2008-0131724, field on Dec. 22, 2008 in the Korean Intellectual Property Office, the disclosure of which is incorporated by reference.

BACKGROUND OF THE INVENTION

1. Field of the Invention

The present invention relates to a transmission method for aggregating a voice frame and a non-voice frame and transmitting and receiving them in a wireless Local Area Network (LAN) Medium Access Control (MAC) layer.

2. Description of the Related Art

Widespread use of the Internet and increasing demand among users for multimedia services such as voice and video services, in addition to data services, is driving up demand for real-time quality assurance for stable provision of multimedia services. Especially, Voice over Internet Protocol (VoIP) for providing voice services using the Internet is an application that requires more real-time quality assurance for the services, because VoIP has a high sensitivity to delay and jitter compared to data and images.

Meanwhile, wireless LANs, which have the advantages of convenient installation and mobility, have been widely deployed since the mid-1990s and widely used in recent years as they offer a transfer rate close to the 100 Mbps of a wired LAN. Besides, mobility and reduction of usage fees can be achieved due to a combination of wireless LAN and VoIP.

The Institute of Electrical and Electronics Engineers (IEEE) developed a standard that defines a protocol for transmission of data frames between a Wireless LAN station and an Access Point (AP). As a result, the IEEE established a standard for Wireless LAN Medium Access Control (MAC) and Physical Layer (PHY) Specifications (IEEE 802.11-PHY/MAC) in 1999, and afterwards established a standard for supporting Quality of Service (QoS) in a MAC layer (IEEE 802.11e) in 2005.

The IEEE 802.11 Wireless LAN standard describes a mobile station and a fixed AP as the two principal elements of a Wireless LAN. A single cell using the IEEE 802.11 WLAN standard is defined as a Basic Service Set (BSS), and a multiple cell is defined as an Extended Service Set (ESS). Each station and each AP implements a MAC layer having a function enabling exchange of MAC frames. The MAC frame is used as a medium for management, control, and data transmission between a wireless station and an AP. An efficient method of transmitting and receiving a MAC frame, especially, a voice frame is required in order to achieve reliable provision of voice services sensitive to delay.

SUMMARY OF THE INVENTION

The present invention relates to a method for transmitting and receiving a frame in a wireless LAN. The method for transmitting and receiving a frame in a wireless LAN according to the present invention is characterized in that transmission wait times of a voice frame and a non-voice frame that are waiting to be transmitted are calculated, and if the transmission wait time of the voice frame is longer than the transmission wait time of the non-voice frame, the voice frame and the non-voice frame are aggregated to generate and transmit an aggregated frame. According to the present invention, the transmission delay of a voice frame can be reduced by performing internal collision resolution and frame aggregation according to the presence or absence of a voice frame awaiting transmission in a MAC layer, thereby reducing an end-to-end voice transmission delay time for a VoIP service.

BRIEF DESCRIPTION OF THE DRAWINGS

The above and other objects, features and advantages of the present invention will become more apparent from the following description of preferred embodiments given in conjunction with the accompanying drawings, in which.

DETAILED DESCRIPTION OF EXEMPLARY EMBODIMENTS

The standards for media access control (MAC) that are currently commercialized include Distributed Coordination Function (DCF) (802.11) and Enhanced Distributed Channel Access (EDCA) (802.11e) methods.

DCF (802.11) will be described first. In DCF, all stations can participate in contention for transmission of a frame. The basic access method of 802.11 MAC is Carrier Sense Multiple Access with Collision Avoidance (CSMA/CA). In CSMA/CA, a station that intends to transmit data to the wireless medium of a WLAN detects the medium to determine whether data is being transmitted from some other station. If the medium is unoccupied, data transmission is performed; otherwise data transmission is delayed until ongoing data transmission is completed.

If data transmission from the station can be performed immediately after previous data transmission to the wireless medium has been completed, transmission attempts from a plurality of stations may occur, and therefore, there is a high probability of data collision. In order to solve this problem, after a certain Inter-Frame Space (IFS) period is provided after completion of data transmission, the size of a Contention Window (CW) is determined by performing binary random backoff, and a station that has the smallest determined CW size is provided with an opportunity to perform transmission. This process is called a Collision Avoidance (CA) function.

In the IEEE 802.11e standard, EDCA defines four access categories (ACs) in order to grant different transmission priorities for different types of application services. EDCA provides service differentiation by assigning a different Arbitrary Inter-Frame Space (AIFS) to each AS and using different CWs for each AC. According to the IEEE 802.11e standard, MAC has a transmission queue for each AC, and a queue for each AC assigns an Arbitrary Inter-Frame Space Number (AIFSN) and a backoff window value according to the EDCA method, and then waits for a frame in its queue to be transmitted. Afterwards, the queue that finishes backoff first gets channel access and transmits the frame. If multiple queues finish their backoff simultaneously, channel access is granted to the queue with the highest user priority (UP) according to the rule of internal collision resolution. However, this method may cause unnecessary delay in the transmission of a voice frame sensitive to delay since this method inevitably incurs internal contention even though different transmission priorities are granted to different ACs.

Figure 1:
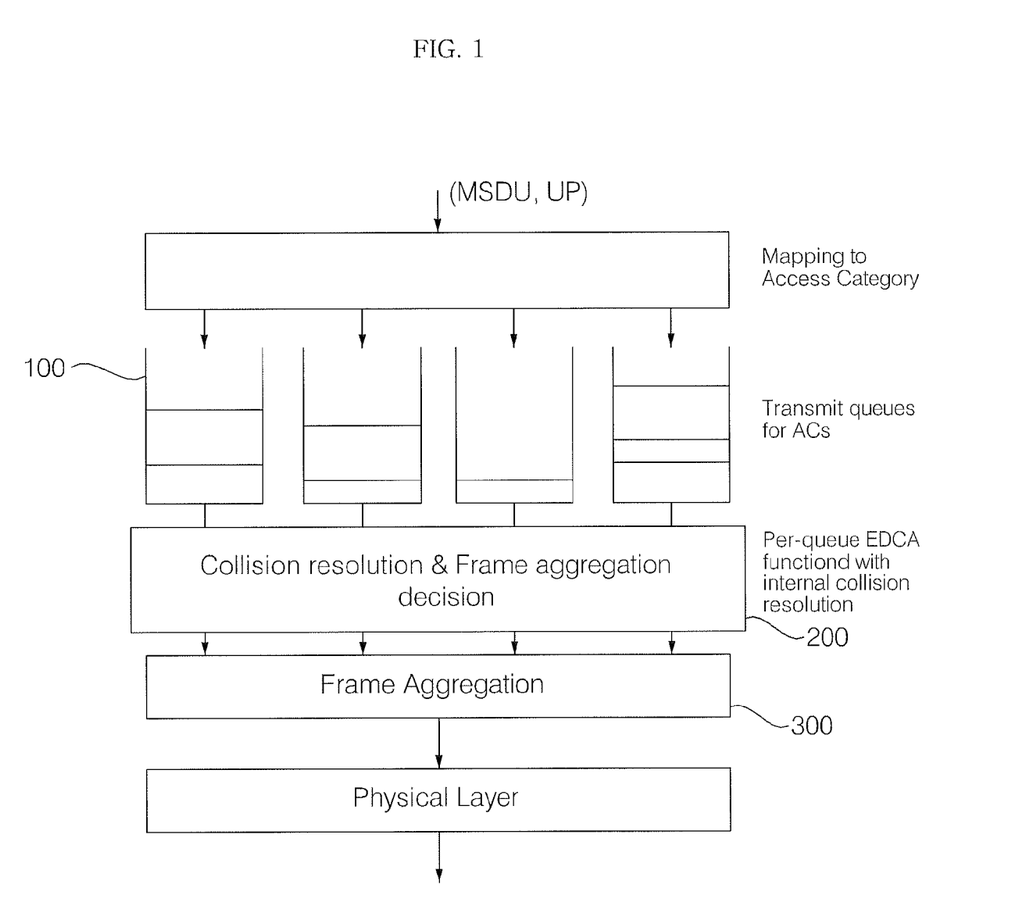
FIG. 1 illustrates a structure for transmitting a frame received from the upper (LLC) layer to the lower (physical) layer through frame aggregation in an IEEE 802.11e-based MAC layer according to the present invention.

FIG. 1 illustrates a structure for transmitting a frame received from the upper (LLC) layer to the lower (physical) layer through frame aggregation in an IEEE 802.11e-based MAC layer according to the present invention.

When a MAC Service Data Unit (MSDU) is received from the upper layer, UPs of data are mapped to their corresponding ACs as shown in Table 1, and input into a transmission queue 100 assigned for each AC.

TABLE 1

| Priority | UP (Same as 802.1D user priority) | 802.1D designation | AC | Designation (informative) |
|---|---|---|---|---|
| Lowest | 1 | BK | AC_BK | Background |
| ↓ | 2 | — | AC_BK | Background |
|  | 0 | BE | AC_BE | Best Effort |
|  | 3 | BE | AC_BE | Best Effort |
|  | 4 | CL | AC_VI | Video |
| Highest | 5 | VI | AC_VI | Video |
|  | 6 | VO | AC_VO | Voice |
|  | 7 | NC | AC_VO | Voice |

The UP of a frame arriving at the MAC layer is assigned to a corresponding AC. Every AC has a transmission queue and an AC parameter, and difference in priority between the ACs is implemented by AC parameters that are set differently from each other. As shown in Table 1, different priorities are applied in order to handle traffic for each of the AC queues. Traffic is classified into four types with increasing priority: background traffic, best effort traffic, video traffic, and voice traffic.

The higher the priority of a frame, the shorter the access wait time for transmission. Moreover, the higher the priority, the smaller the sizes of contention windows CWmin[AC] and CWmax[AC]. Consequently, an attempt to transmit a frame can be made after use of a relatively small time slot.

As shown in FIG. 1, each of the four AC transmission queues defined in 802.11e MAC functions as an individual EDCA contention entity to access a wireless medium within a station (STA). Each AC may have a unique AIFS value.

Figure 2:
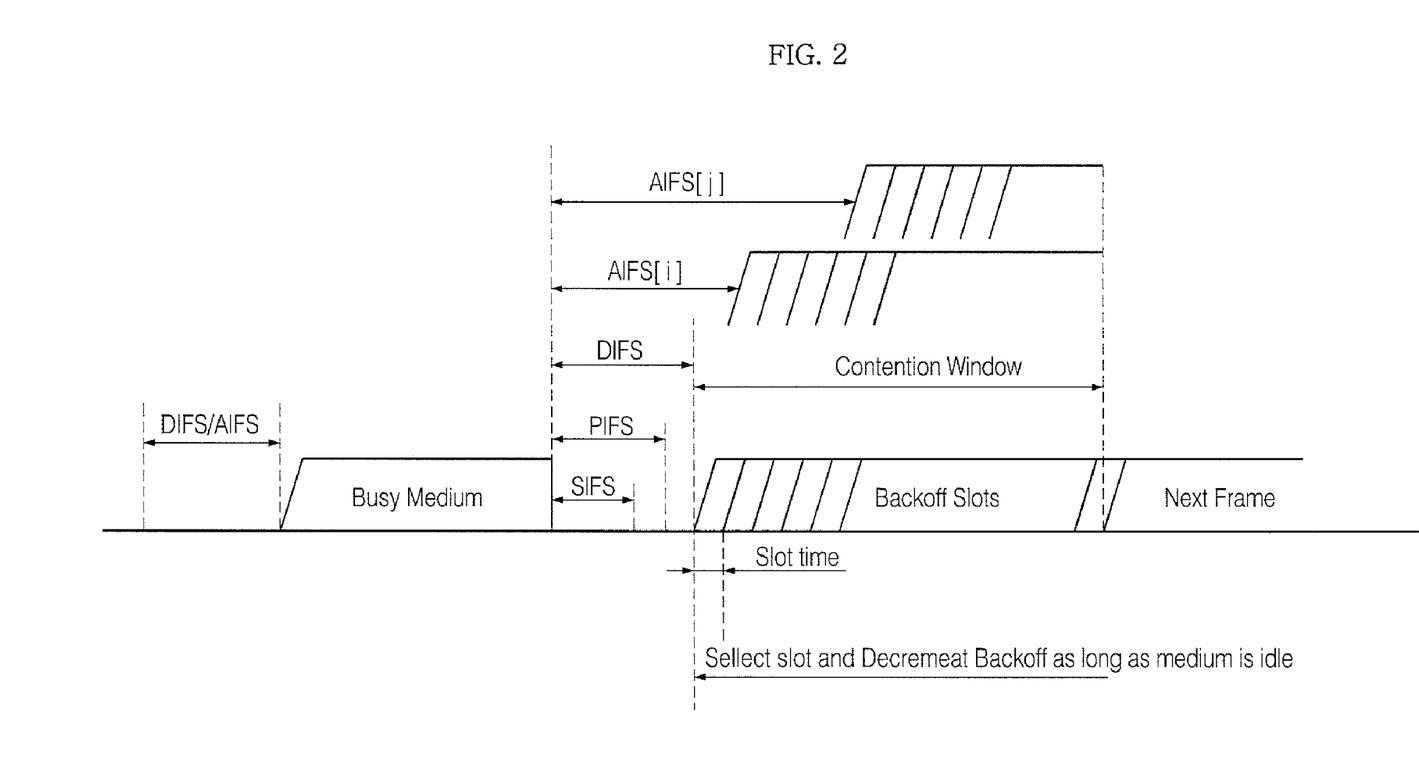
FIG. 2 is a view schematically illustrating an Enhanced Distributed Channel Access (EDCA) method.

FIG. 2 is a view schematically illustrating an EDCA method.

In DCF, transmission begins after a duration of a DCF Inter-Frame Space (DIFS), while in EDCA, transmission begins after the duration of an AIFS. Each output queue sends traffic by using AIFSs that differ according to priority. The AIFS, which is a wait time before transmission in EDCA, is longer than the DIFS of DCF to protect the transmission of ACK frames or the like.

Backoff occurs in the following situation. Backoff is used in a case where retransmission is required due to transmission collision when a station sends a frame. To start backoff, the station sets a backoff time in a backoff timer.

A queue for each AC assigns an AIFSN and a backoff window value according to an EDCA method, and then waits for a frame in its queue to be transmitted. At this point, each queue is granted channel access according to a method of Collision Resolution and Frame Aggregation Decision (CR_FAD) 200.

CR_FAD 200 compares transmission wait times of a voice queue (AC_VO) and a non-voice queue (AC_BK, AC_BE, AC_VI), which are determined by their AIFSNs and backoff window sizes, and if a transmission wait time of the voice queue is longer than a transmission wait time of the non-voice queue, decides to aggregate the frames. If the transmission wait time of the voice queue is equal to or smaller than the transmission wait time of the non-voice queue, the voice queue is given priority for transmission.

When frame aggregation is decided by CR_FAD 200, a frame aggregation block 300 modifies the header format of a MAC frame based on the destination address of transmission frames so that the receiving station (STA) may recognize that the transmission frames are aggregated. Further, if the transmission rates of frames to be aggregated are different, the aggregated frame is sent at the lowest transmission rate so that the destination station may receive them.

Furthermore, a method for transmitting and receiving a frame in a wireless LAN according to the present invention comprises the steps of: calculating a transmission wait time of a voice frame waiting to be transmitted; calculating a transmission wait time of a non-voice frame waiting to be transmitted; and if the transmission wait time of the voice frame is longer than the transmission wait time of the non-voice frame, aggregating the voice frame and the non-voice frame to create and transmit an aggregated frame.

Moreover, in the method for transmitting and receiving a frame in a wireless LAN according to the present invention, if the transmission wait time of the voice frame is smaller than or equal to the transmission wait time of the non-voice frame, the voice frame can be given transmission priority and transmitted.

Prior to the step of calculating the transmission wait times of a voice frame and a non-voice frame, the method may further comprise the step of checking whether or not there is a frame waiting to be transmitted in an access category queue.

Figure 3:
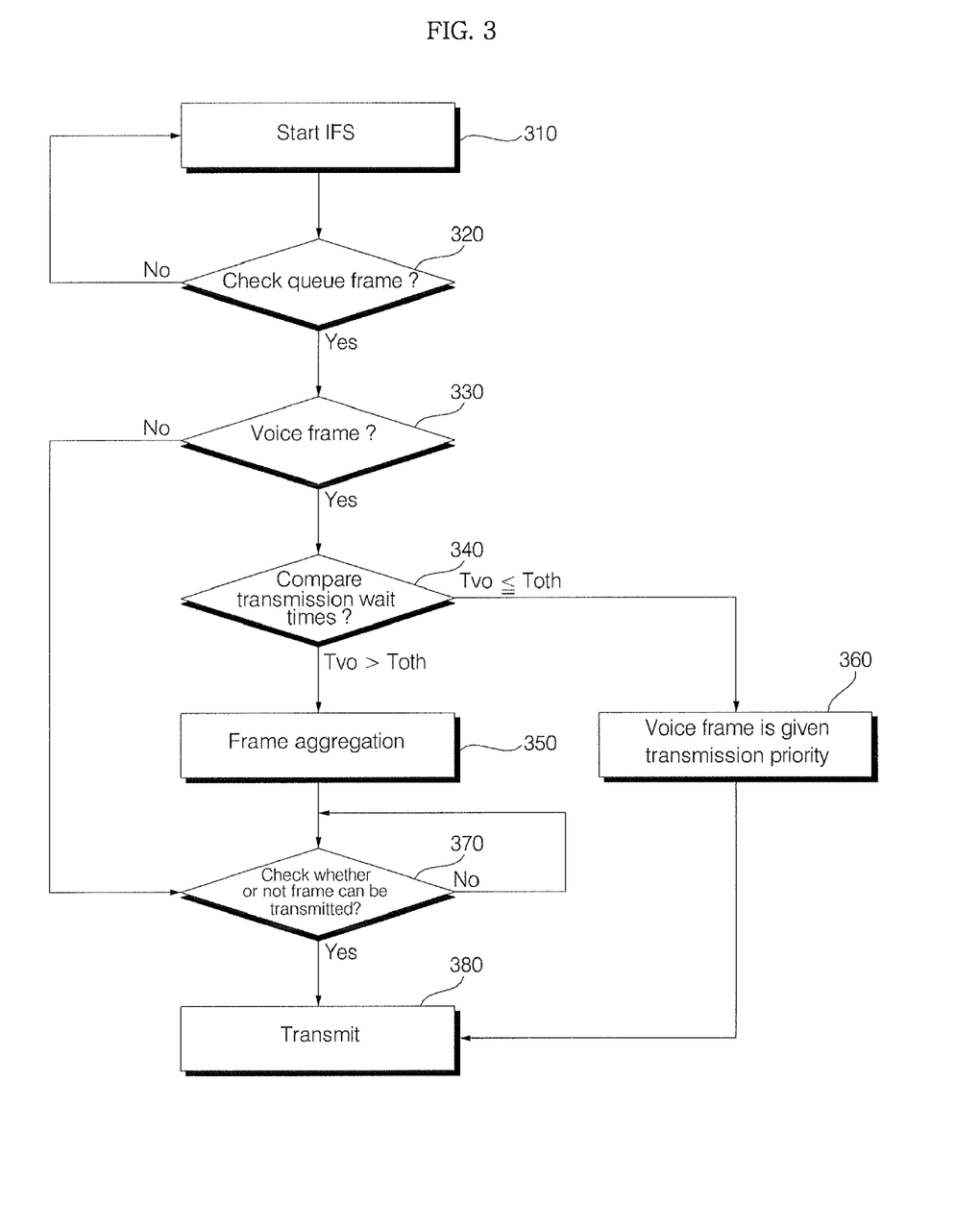
FIG. 3 is a flowchart showing one exemplary embodiment of a method for transmitting and receiving a frame in a wireless LAN according to the present invention.

FIG. 3 is a flowchart showing one exemplary embodiment of a method for transmitting and receiving a frame in a wireless LAN according to the present invention.

The internal collision resolution and frame aggregation procedure will be explained. According to EDCA, If there is a frame being transmitted on a wireless channel before sending its own frames, if the channel is busy as there is a frame being transmitted, the MAC waits until frame transmission is completed and the channel becomes idle. The point of time when the channel becomes idle is the start 310 of an IFS (Inter-Frame Space).

When the IFS starts, the CR_FAD 200 checks in 320 whether or not there is a frame waiting to be transmitted in every AC queue. The voice and non-voice frames may be assigned to different queues from each other. Next, it is judged in 330 whether or not there is a voice frame waiting in the voice queue (AC_VO).

A frame waiting to be transmitted in each queue waits for transmission during a time calculated from the AIFSN value and backoff window value assigned for each AC as specified in the following Table 2.

TABLE 2

| AC | CWmin | CWmax | AIFSN |
|---|---|---|---|
| AC_BK | aCWmin | aCWmax | 7 |
| AC_BE | aCWmin | aCWmax | 3 |
| AC_VI | (aCWmin + 1)/2 − 1 | aCWmin | 2 |
| AC_VO | (aCWmin + 1)/4 − 1 | (aCWmin + 1)/2 − 1 | 2 |

Here, AIFSN is the number of slots indicating a time delay which occur before starting the transmission of traffic of the corresponding AC or calling the backoff procedure defined in the standard. AIFSN[AC] is a time period to wait before the initial transmission or retransmission of a specific frame. Therefore, an AIFS is a time period obtained by multiplying an AFISN by a slot time and then adding a Short Inter-Frame Space (SIFS) thereto.

$$AIFS[AC] = AIFSN[AC] \times aSlotTime + aSIFSTime \quad [\text{Equation 1}]$$

Slot time and SIFS vary according to the mechanism of IEeE 802.11 used for a physical layer, and AIFSN can be changed for each AC by a user. As for the values of CWmin and CWmax, the voice parameter (AC_VO) has a smaller value than the non-voice parameter by (CWmin+1)/2−1~ (CWmin+1)4−1, which is changeable.

$$T(\text{transmission wait time}) = AIFS[AC] + Backoff\_Time \quad [\text{Equation 2}]$$

As in the above Equation 2, T (transmission wait time) is determined by the sum of AIFS[AC] and Backoff_Time, in which AIFS[AC] is an integer greater than 0. The transmission wait time may be calculated for each queue assigned with frames.

In the contention for transmission of frames which belong to the ACs, EDCA uses AIFS[AC], CWmin[AC], and CWmax[AC]. The values of AIFS[AC], CWmin[AC], and CWmax[AC] can be notified to each receiving station (STA) through a beacon frame.

CWmin[AC] and CWmax[AC] represent a minimum value and a maximum value when a backoff time for retransmission after failure of initial transmission of a specific frame is determined:

$$Backoff\_Time = Random(\ ) \times aSlotTime \quad [\text{Equation 3}]$$

Here, Random( ) is an integer drawn from a uniform distribution over the interval [0, CW], and CW is a value within the range between aCWmin and aCWmax, i.e., aCWmin<=CW<=aCWmax.

Basically, the smaller the values of AIFS[AC] and CWmin [AC] are, the higher priority a STA has. Accordingly, channel access delay is shortened, and thus a wider bandwidth can be used in a given traffic environment.

As seen from above, the transmission wait time is determined as AIFS[AC]+Backoff_Time.

Accordingly, in the transmission wait time comparison step 340, a transmission wait time Tvo(=AIFS[AC_VO]+ Backoff_Time[AC_VO]) of a voice frame and a transmission wait time Toth(=AIFS[AC_BK, AC_BE, AC_VI]+Backoff_Time [AC_BK, AC_BE, AC_VI] of a non-voice frame are compared.

As a result of comparison, if the transmission wait time Tvo of a voice frame is greater than the transmission wait time Toth of a frame from another AC, frame aggregation is performed in 350. Otherwise, the voice frame is given transmission priority and transmitted first in 360.

In the frame aggregation step 350, aggregation of a voice frame and a non-voice frame is performed. Once frame aggregation is completed, the MAC checks the channel status to see whether the frame can be sent or not in 370, and if so, sends the frame.

Figure 4:
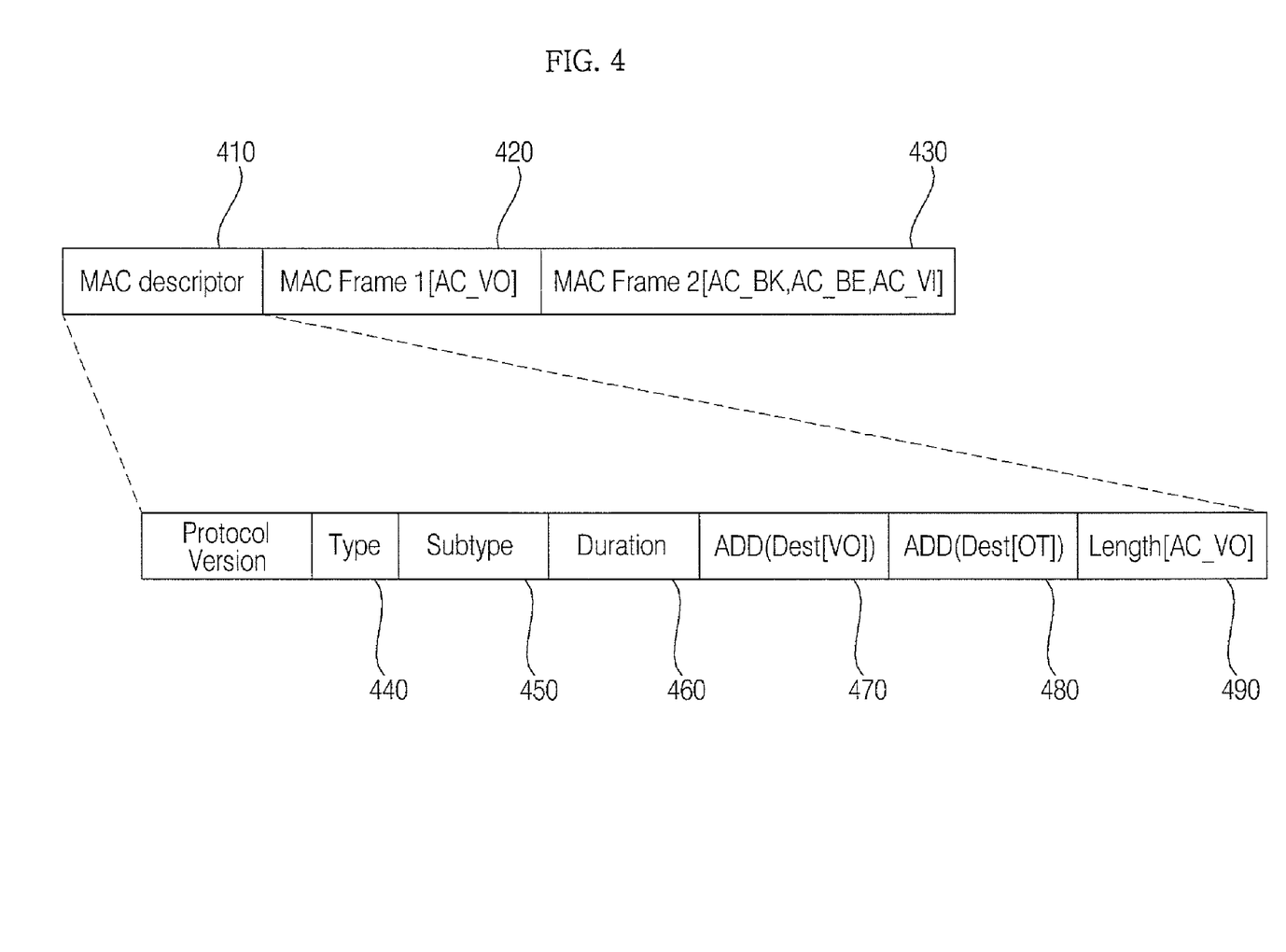
FIG. 4 illustrates one exemplary embodiment of an aggregation method of a voice frame and a non-voice frame.

FIG. 4 illustrates one exemplary embodiment of an aggregation method of a voice frame and a non-voice frame. Frame aggregation is done in the order of a MAC descriptor 410, a voice MAC frame 420, and a non-voice MAC frame 430.

The MAC descriptor 410 may include an identifier representing the aggregated frame, information about time taken for aggregated frame exchange, a destination address of the aggregated frame, and information about the length of the voice frame.

The MAC descriptor for allowing a MAC frame receiving station to recognize an aggregated frame displays the aggregated frame by using the values of a Type 440 field and a Subtype 450 field, records a channel occupation time for the aggregated frame in a Duration 460 field, records the destination of the aggregated frame in ADD(Dest[VO]) 470 and ADD(Dest[OT]) 480 fields, and records the length of the voice frame in a Length[AC_VO] 490 field.

The method for transmitting and receiving a frame in a wireless LAN according to the present invention may comprise the steps of: a receiving station checking whether the address of the receiving station is included in the MAC descriptor of a frame; if the address of the receiving station is included, judging whether the frame is an aggregated frame or not from the MAC descriptor; and if the frame is an aggregated frame, extracting the voice frame and the non-voice frame.

Figure 5:
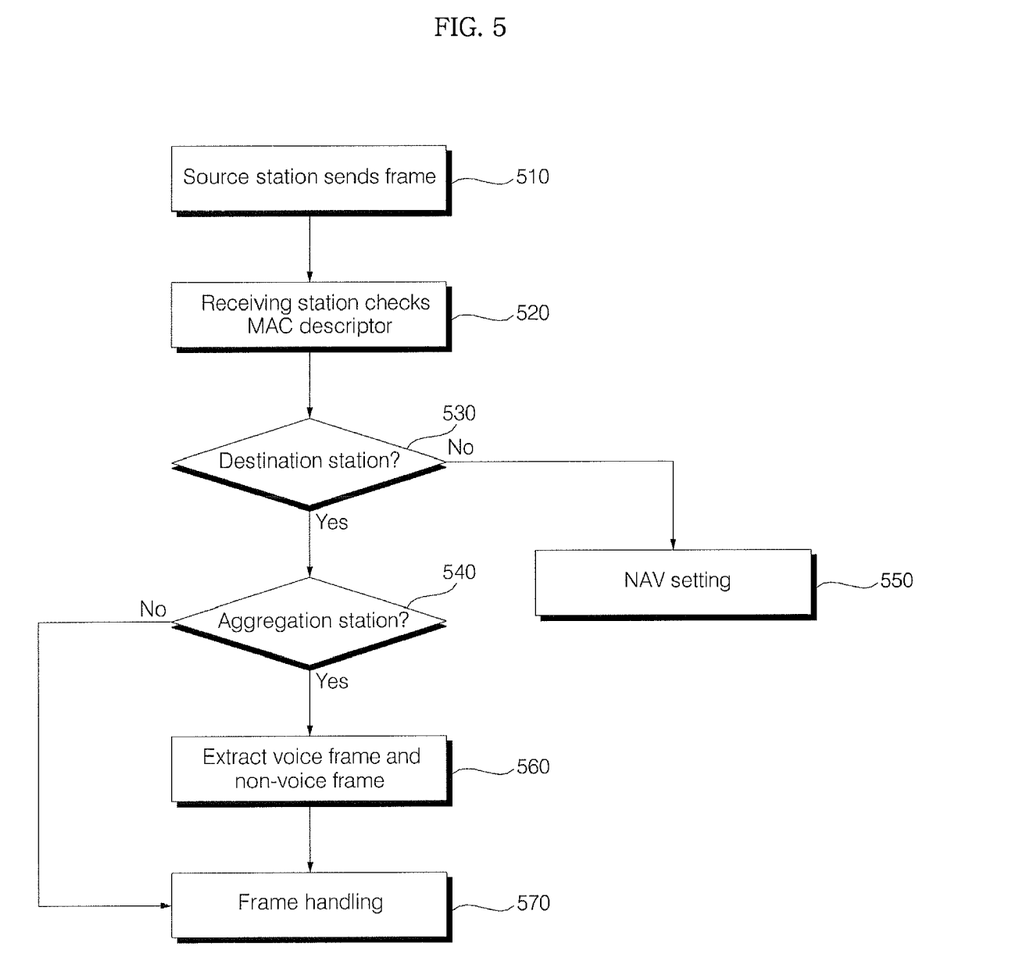
FIG. 5 is a flowchart showing one exemplary embodiment of a method for transmitting and receiving a frame in a wireless LAN according to the present invention.

FIG. 5 is a flowchart showing one exemplary embodiment of a method for transmitting and receiving a frame in a wireless LAN according to the present invention.

When a source station sends a frame in 510, a receiving station checks the MAC descriptor. The receiving station checks whether its address is included in the ADD(Dest[VO]) 470 and ADD(Dest[OT]) 480 fields, and if its address is included as a destination station in 530, checks the values of the Type 440 field and Subtype 450 field and judges whether the frame is an aggregated frame or not in 540.

A voice frame and a non-voice frame are extracted in 560. When the frame is successfully received, an ACK frame is transmitted immediately after the duration of an SIFS time to notify of the reception of the frame. If no ACK frame is received after data transmission, retransmission is performed after a random backoff.

If the receiving station is not a destination station, a NAV is set so that no frame is received in 550. When the NAV time is set, stations with the NAV setting do not perform contention for media access before the corresponding NAV becomes zero.

Figure 6:
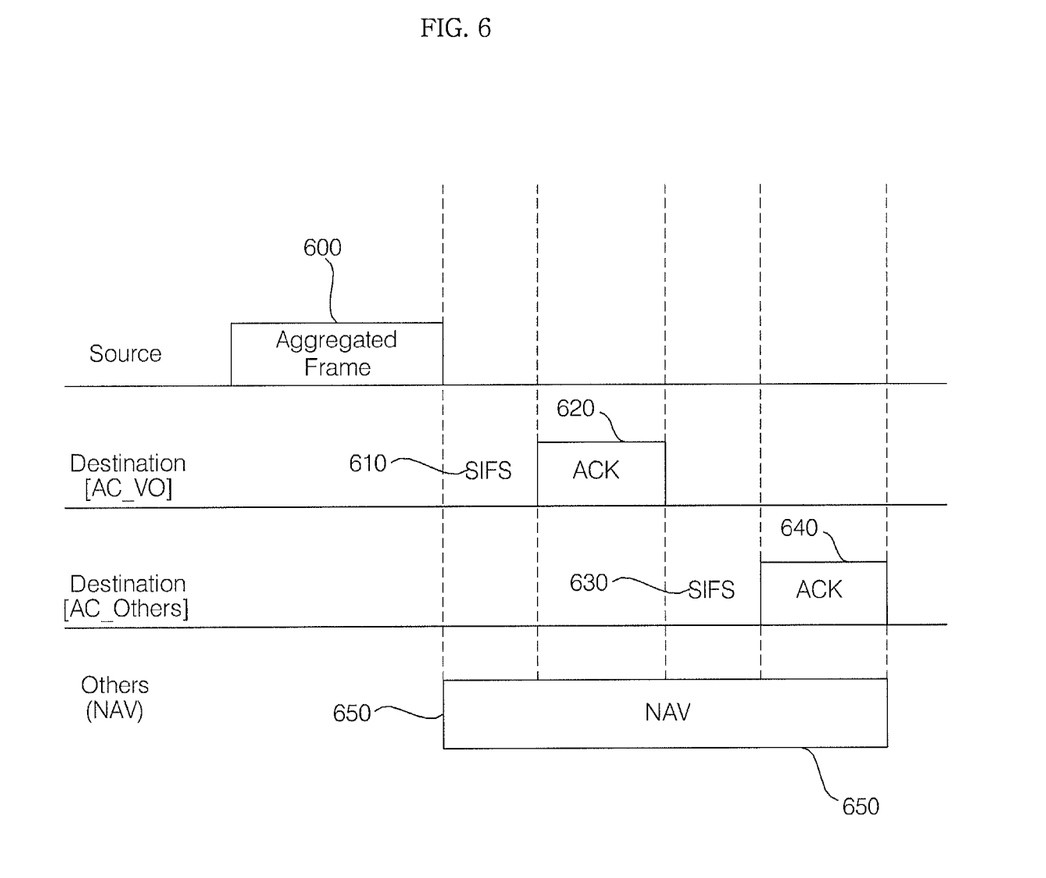
FIG. 6 schematically illustrates a frame exchange procedure between a station transmitting an aggregated frame and a station receiving the same.

FIG. 6 schematically illustrates a frame exchange procedure between a station transmitting an aggregated frame and a station receiving the same. When the source station sends a frame 600, a receiving station in a BSS decodes the destination address from the MAC descriptor to determine whether to receive a frame or not. The destination station (Destination [AC_VO]) of a voice frame receives an aggregated frame and then sends an ACK frame 620 to the source station after an SIFS 610.

After completion of the transmission of the ACK frame 620 for a voice frame, the destination station (Destination[AC_Others]) sends the ACK frame 640 to the source station after the duration of an SIFS 630.

Stations other than the corresponding destination stations of the aggregated frame set their NAV to 2*SIFS+2*ACK-time after the duration of the aggregated frame. That is, the NAV is set so that no frame is received until the transmission of an ACK frame 640 of a station having received a non-voice frame is completed.

While exemplary embodiments of the present invention have been shown and described above, the present invention is not limited thereto but rather can be implemented in various modified forms, which may suggest themselves to those skilled in the art, without departing from the spirit or scope of the present invention defined by the appended claims.

What is claimed is:

1. A method for transmitting and receiving a frame in a wireless local area network (LAN), comprising the steps of:
   calculating, for a voice frame within a first transmission queue, a first queue transmission wait time;
   calculating, for a non-voice frame within a second transmission queue, a second queue transmission wait time; and
   if the first queue transmission wait time is longer than the second queue transmission wait time, aggregating the voice frame and the non-voice frame to create and transmit an aggregated frame wherein the aggregated frame comprises the voice frame, the non-voice frame, and a media access control (MAC) descriptor, and wherein the MAC descriptor includes an identifier representing the aggregated frame, information about time taken for aggregated frame exchange, destination addresses of the aggregated frame, and information about the length of the voice frame.

2. The method of claim 1, wherein if the first transmission wait time is equal to or smaller than the second transmission wait time, the voice frame is given transmission priority and transmitted.

3. The method of claim 1, wherein the voice frame and the non-voice frame are assigned to different transmission queues from each other.

4. The method of claim 3, wherein the first transmission wait time and the second transmission wait time are calculated for each transmission queue assigned with frames.

5. The method of claim 1, wherein the aggregated frame is generated in the order of the MAC descriptor, the voice frame, and the non-voice frame.

* * * * *